United States Patent
Voit et al.

(10) Patent No.: US 12,441,175 B2
(45) Date of Patent: Oct. 14, 2025

(54) DRIVE UNIT AND DRIVE ASSEMBLY

(71) Applicant: Schaeffler Technologies AG & Co. KG, Herzogenaurach (DE)

(72) Inventors: Alexander Voit, Sinzheim (DE); Steffen Lehmann, Ettlingen (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 353 days.

(21) Appl. No.: 18/024,601

(22) PCT Filed: Jul. 20, 2021

(86) PCT No.: PCT/DE2021/100629
§ 371 (c)(1),
(2) Date: Mar. 3, 2023

(87) PCT Pub. No.: WO2022/048702
PCT Pub. Date: Mar. 10, 2022

(65) Prior Publication Data
US 2023/0322071 A1    Oct. 12, 2023

(30) Foreign Application Priority Data

Sep. 4, 2020    (DE) ..................... 10 2020 123 116.4

(51) Int. Cl.
*B60K 6/26*        (2007.10)
*B60K 6/36*        (2007.10)
(Continued)

(52) U.S. Cl.
CPC .................. *B60K 6/26* (2013.01); *B60K 6/36* (2013.01); *B60K 6/48* (2013.01); *B60K 6/547* (2013.01);
(Continued)

(58) Field of Classification Search
CPC ........ B60K 2006/264; B60K 2006/266; B60K 6/26; B60K 6/48; B60K 6/547
See application file for complete search history.

(56) References Cited

U.S. PATENT DOCUMENTS

| | | | | |
|---|---|---|---|---|
| 5,905,346 A | * | 5/1999 | Yamada | B60K 6/40 |
| | | | | 903/906 |
| 5,920,160 A | * | 7/1999 | Yamada | B60W 10/06 |
| | | | | 903/906 |

(Continued)

FOREIGN PATENT DOCUMENTS

| | | |
|---|---|---|
| DE | 112015006071 | 10/2017 |
| DE | 102019132941 | 6/2021 |

(Continued)

*Primary Examiner* — Jeffrey J Restifo
(74) *Attorney, Agent, or Firm* — Volpe Koenig (57) ABSTRACT

A drive unit for a drive train of an electrically drivable motor vehicle, in particular a hybrid motor vehicle, and to a drive assembly. The drive unit is for a drive train of an electrically drivable motor vehicle, and includes a first electric rotary machine for generator operation and a second electric rotary machine for drive motor operation, and a transmission. A rotor of the first electric rotary machine is for direct mechanical coupling to an output element of an internal combustion engine, and a rotor of the second electric rotary machine is or can be rotationally coupled to an input of the transmission, with no torque-transmitting connection being provided between the first electric rotary machine and the transmission.

19 Claims, 4 Drawing Sheets

(51) Int. Cl.
*B60K 6/48* (2007.10)
*B60K 6/547* (2007.10)
*B60K 11/02* (2006.01)
*H02K 7/00* (2006.01)
*H02K 7/116* (2006.01)
*H02K 9/19* (2006.01)

(52) U.S. Cl.
CPC .............. *B60K 11/02* (2013.01); *H02K 7/006* (2013.01); *H02K 7/116* (2013.01); *H02K 9/19* (2013.01); *B60Y 2200/92* (2013.01)

(56) References Cited

U.S. PATENT DOCUMENTS

| | | | | |
|---|---|---|---|---|
| 5,942,862 A * | 8/1999 | Yamada | ............... | B60K 6/40 |
| | | | | 903/906 |
| 5,973,460 A * | 10/1999 | Taga | ............... | B60L 50/16 |
| | | | | 903/906 |
| 5,998,901 A * | 12/1999 | Kawabata | ............... | B60W 20/10 |
| | | | | 903/910 |
| 8,096,375 B2 * | 1/2012 | Jinno | ............... | B60K 6/547 |
| | | | | 180/65.265 |
| 8,103,394 B2 * | 1/2012 | Hashimoto | ............... | B60W 20/00 |
| | | | | 477/3 |
| 8,127,874 B2 * | 3/2012 | Suzui | ............... | B60K 6/365 |
| | | | | 180/65.265 |
| 8,140,207 B2 * | 3/2012 | Nozaki | ............... | B60W 20/30 |
| | | | | 180/65.21 |
| 8,204,639 B2 * | 6/2012 | Jinno | ............... | B60W 50/082 |
| | | | | 180/65.265 |
| 8,215,424 B2 * | 7/2012 | Kaita | ............... | B60W 20/15 |
| | | | | 180/65.265 |
| 9,102,227 B2 * | 8/2015 | Yang | ............... | B60K 6/448 |
| 11,441,645 B2 * | 9/2022 | Van Dingenen | ............... | F16H 3/728 |
| 11,845,336 B2 * | 12/2023 | Choi | ............... | B60K 6/387 |
| 12,145,446 B2 * | 11/2024 | Su | ............... | B60W 20/20 |
| 2016/0218584 A1 * | 7/2016 | Fukushima | ............... | H02K 5/225 |
| 2017/0282702 A1 * | 10/2017 | Kim | ............... | B60K 6/40 |
| 2021/0199179 A1 * | 7/2021 | Xie | ............... | B60K 6/387 |
| 2023/0322071 A1 * | 10/2023 | Voit | ............... | B60K 6/46 |
| | | | | 180/65.25 |
| 2024/0001754 A1 * | 1/2024 | Suzuki | ............... | B60W 20/20 |
| 2024/0001907 A1 * | 1/2024 | Umemura | ............... | B60W 10/26 |
| 2024/0017711 A1 * | 1/2024 | Oe | ............... | B60L 50/61 |
| 2024/0239178 A1 * | 7/2024 | Ishibashi | ............... | B60K 6/40 |

FOREIGN PATENT DOCUMENTS

| | | |
|---|---|---|
| EP | 1847411 | 5/2010 |
| EP | 1502791 | 10/2013 |
| EP | 2308708 | 8/2016 |
| JP | H071975 A | 1/1995 |
| JP | H0776229 A | 3/1995 |
| JP | 2001138752 | 5/2001 |
| JP | 2010000859 A | 1/2010 |
| JP | 2020110487 | 7/2020 |
| WO | 2010095610 | 8/2010 |
| WO | 2019101264 | 5/2019 |

\* cited by examiner

DRIVE UNIT AND DRIVE ASSEMBLY

CROSS-REFERENCE TO RELATED APPLICATIONS

This application is the U.S. National Phase of PCT Appln. No. PCT/DE2021/100629, filed Jul. 20, 2021, which claims the benefit of German Patent Appln. No. 102020123116.4, filed Sep. 4, 2020, the entire disclosures of which are incorporated by reference herein.

TECHNICAL FIELD

The disclosure relates to a drive unit for the drive train of an electrically drivable motor vehicle, in particular a hybrid motor vehicle, and to a drive assembly.

BACKGROUND

Various drive units are known from the background of the art which are integrated into drive assemblies or drive trains and which use an internal combustion engine and two electric machines. Such type of corresponding construction is known, for example, from US 2016/0218584 A1.

DE 11 2015 006 071 T5 discloses a hybrid vehicle drive system with a generator capable of generating electrical energy using the power of an internal combustion engine; an electric motor driven by electrical energy to drive wheels; a housing accommodating the generator and the electric motor; and a power control unit for controlling the generator and the electric motor. The generator and the electric motor are arranged side by side on the same axis in the housing.

WO 2019 101 264 A1 discloses a drive train for a hybrid motor vehicle. The drive train comprises a transmission input shaft which is operatively connected to a first electric machine and an internal combustion engine via a first sub-drive train so as to transmit torque and which is operatively connected to a second electric machine via a second sub-drive train so as to transmit torque. The two electric machines are arranged coaxially and axially adjacent to one another.

EP 1502791 B1 and EP1847411 B1 each disclose a hybrid transmission for a hybrid vehicle having a plurality of electric rotary machines. The electric machines are arranged radially embedded within each other. In this case, the radially external electric rotary machine is designed as an outer rotor.

A motor vehicle drive system is also known, for example, from DE 10 19 132 941. This application relates to a drive unit for a drive train of an electrically drivable motor vehicle, particularly of a hybrid vehicle, comprising a first electric rotary machine and a second electric rotary machine, and a first shaft and a second shaft, wherein a rotor of the first electric rotary machine is connected to the first shaft in a rotationally fixed manner and a rotor of the second electric rotary machine is connected to the second shaft in a rotationally fixed manner and wherein the drive unit further has a separating clutch, with which the rotor of the first electric rotary machine can be connected or is connected to the second shaft for transmitting torque.

The Nissan company has presented an "e-POWER" configuration, in which both a generator and an electric motor are used between an internal combustion engine and the driven wheels.

With the previously presented hybrid drives with two electric rotary machines, it was typically possible to mechanically couple the output of the internal combustion engine to the drive of the vehicle equipped with the hybrid transmission, for example to a drive axle. A separating clutch is used for this in many designs This embodiment has the advantage, particularly for vehicles which are equipped for continuous driving operation at speeds of more than 130 km/h, that parallel operation of the drive units or even a vehicle drive driven purely by the combustion engine can be implemented, since the efficiency of an electric drive typically reduces as the speed increases.

However, integrating a drive unit with several electric rotary machines into a drive assembly intended for a hybrid motor vehicle is subject to strict installation space requirements.

An axially especially short drive assembly is advantageous, in particular when such a drive unit is used in so-called front-transverse arrangements in motor vehicles, in which the electric rotary machines and the internal combustion engine are used as front drives and a respective axis of rotation of an electric rotary machine and the internal combustion engine is arranged transverse to the longitudinal direction of the motor vehicle.

SUMMARY

On this basis, the object of the present disclosure is to provide a drive unit and a drive assembly equipped therewith, which ensure optimum operation in an economical design and in a space-saving manner.

The object is achieved by the drive unit having one or more of the features described herein. Advantageous embodiments of the drive unit are listed below and in the claims. In addition, a drive assembly having the drive unit with one or more of the features described herein is provided.

The features of the claims can be combined in any technically useful manner, wherein the explanations from the following description as well as features from the figures can also be consulted for this purpose, which comprise supplementary embodiments of the disclosure.

In connection with the present disclosure, the terms "axial" and "radial" always refer to the axis of rotation of an electric rotary machine of the drive unit.

The disclosure relates to a drive unit for a drive train of an electrically drivable motor vehicle, comprising a first electric rotary machine designed for generator operation and a second electric rotary machine designed for drive motor operation, and a transmission, wherein a rotor of the first electric rotary machine is designed for direct mechanical coupling to an output element of an internal combustion engine. A rotor of the second electric rotary machine is coupled or can be coupled to an input of the transmission in a rotationally fixed manner. There is no torque-transmitting connection between the first electric rotary machine and the transmission The drive unit can be characterized as a so-called hybrid transmission.

This means that the drive unit is configured to establish a connection, solely between the first electric machine and the internal combustion engine, which is directly mechanical, torque-locked, and particularly long-term, such as, for example, a fixed screw connection, or to implement a torque-transmission path. In this case, it is insignificant if machine elements, with which no influence can be made on the size of the torque or rotational speed to be transmitted, are arranged between the first electric rotary machine or the rotor thereof and the internal combustion engine or the output side thereof.

A transmission of torque from the electric rotary machine and/or from the internal combustion engine to the transmission is excluded by design.

With the internal combustion engine, the first electric rotary machine can be operated in generator mode by supplying torque from the internal combustion engine. The electrical energy thereby generated can be provided to the second electric rotary machine, either directly or through interim storage in a battery, in order to propel the vehicle, wherein the rotation of the rotor of the second electric rotary machine is stepped up or stepped down by means of the transmission and, in this manner, the drive wheels of a motor vehicle equipped with the drive unit can be driven.

The fact that there is no clutch and no further elements transmitting any torque between the first electric rotary machine and the transmission or between the internal combustion engine and the transmission results in advantages with respect to the installation space and the complexity in producing the individual parts required and the assembly thereof.

In one particular embodiment, the entire drive unit can be implemented without a clutch.

Accordingly, an especially compact design of a hybrid vehicle drive train can be implemented.

A stator of the first electric rotary machine is firmly connected to the housing of the drive unit and is also formed from said housing in regions.

The internal combustion engine has a torque-locked connection, advantageously by means of a drive shaft, to the first electric rotary machine, which is designed as a generator, wherein it is particularly provided that there is no gear ratio between the internal combustion engine and the first electric rotary machine.

Thus, a two-electric-machine transmission for serial vehicles is provided with two electric rotary machines arranged particularly coaxially to one another, wherein one of the two electric rotary machines is designed as the generator and the other is designed as the drive machine. The internal combustion engine is not coupled to the vehicle wheels, so that the arrangement of an otherwise customary clutch is dispensed with, as is an actuating unit for engaging the clutch.

In particular, the first electric rotary machine can be designed as an inner rotor machine.

In an alternative embodiment, the first electric rotary machine is designed as an outer rotor machine.

It is advantageously provided in both embodiments that the rotor of the first electric rotary machine is coupled, particularly bolted, directly to the crankshaft of the internal combustion engine.

Alternatively or additionally, it may be provided that the second electric rotary machine is designed as an inner rotor machine or as an outer rotor machine.

An embodiment of the rotor of the first electric rotary machine as an inner rotor is particularly considered when the comparatively low mass moment of inertia is sufficient for reducing rotational irregularities or torque fluctuations in the internal combustion engine.

One of the two electric rotary machines can be arranged at least partly radially as well as axially within an area radially delimited by the other respective electric rotary machine. This results in an axially especially compact embodiment.

In order to use as many of the same parts as possible, it is advantageous when the first electric rotary machine has a rotor which is designed as an inner rotor and the second electric rotary machine has a rotor which is designed likewise as an inner rotor. Alternatively, the two rotors can also be designed as outer rotors.

The rotor of the first electric rotary machine can advantageously be designed as a flywheel for operating the internal combustion engine.

Accordingly, the mass moment of inertia of the rotor of the first electric machine in this case can be used to operate the internal combustion engine. Rotational irregularities or torque fluctuations in the internal combustion engine can thereby be reduced. This embodiment is particularly considered when the rotor of the first electric rotary machine is implemented as an outer rotor and has a correspondingly large mass moment of inertia.

Furthermore, the mass moment of inertia of the rotor of the first electric rotary machine can be used particularly when starting the internal combustion engine.

The axes of rotation of the rotors of the electric rotary machines can be arranged axis-parallel or coaxially.

In one particular embodiment, it is provided that the axes of rotation of the rotors of the electric rotary machines are arranged coaxially.

In a further advantageous embodiment of the drive unit, it is provided that the first electric rotary machine is arranged in a generator compartment which is spatially separate from the transmission.

This generator compartment has the advantage that it can be temperature-controlled essentially independently of the transmission or of the second electric rotary machine. In particular, an at least partial filling of the generator compartment with a medium, for example oil or water, can be provided when the first electric rotary machine is implemented with oil cooling or water cooling.

In an alternative embodiment, the generator compartment can also be designed as a dry space. This is particularly possible when the first electric rotary machine is equipped with a water-cooled stator and, consequently, no additional cooling is necessary. This embodiment has the advantage that no leaks can occur in the generator compartment and consequently there is also no pressure loss due to necessary distribution of the medium, which is associated with an increase in the efficiency. The transmission may be arranged in a gear compartment, wherein particularly the second electric rotary machine can likewise be placed in the gear compartment.

Furthermore, the second electric rotary machine can also be spatially separate from the transmission.

The arrangement of a respective electric rotary machine in a dry space also has advantages with respect to the assembly since few or no measures would have to be undertaken to seal it off from the transmission.

Advantageously, the transmission comprises a first transmission ratio stage as well as a second transmission ratio stage coupled thereto.

The transmission ratio stages are designed particularly based on pairs of gear wheels, which may also be designed as components of a planetary gear unit or epicyclic gearing.

In alternative embodiments, the transmission can also have only one transmission ratio stage or more than two transmission ratio stages.

However, it is also possible to implement a step-down using the transmission ratio stages.

Furthermore, the transmission may have a differential gear which is coupled to the second transmission ratio stage in a torque-locked manner. Output elements of the differential gear may be drive shafts and also drive elements of a motor vehicle equipped with the drive unit.

The output wheel of the first transmission ratio stage and the drive wheel of the second transmission ratio stage can be arranged on an intermediate shaft of the transmission such that an especially low-wear torque transmission is possible.

In order to increase the efficiency of the drive unit, the first electric rotary machine and/or the second electric rotary machine can be configured for cooling by means of a fluid.

In particular, oil or also water cooling or a combination thereof may be provided. With pure water cooling of the second electric rotary machine, it is advantageous to seal it off from the oil-filled gear compartment.

Particularly with vehicles having a large amount of electric driving and rare generator operation, separate cooling of the two electric rotary machines has the advantage that, when the first electric rotary machine is not being used as a generator, the cooling operation thereof can be switched off or reduced in order to minimize energy losses.

In order to implement different operating modes, the two electric rotary machines can be conductively connected to one another electrically or connected to one another by means of an electrical storage element.

In a further embodiment, the two electric rotary machines can also be coupled to one another electrically indirectly via power electronics.

In the first-mentioned embodiment, there is accordingly a direct electrical connection between the two electric rotary machines so that electrical energy generated by the first electric rotary machine during generator operation can be provided to the second electric rotary machine, optionally via power electronics, in order to implement motor operation.

In this manner, stored electrical energy is not needed to operate the internal combustion engine.

In the second-mentioned alternative, initially electrical energy is generated during operation of the internal combustion engine and this energy is stored in an electric storage element, such as a battery for example, from which it can be provided to the second electric rotary machine in order to implement motor operation at a later point in time.

In general in this case, a combined operation of the two aforementioned alternatives is also possible, namely simultaneous electrical feed to the second electric rotary machine due to the generator operation of the first electric rotary machine and a charging of the electrical storage element. In addition, this enables an increase or shifting of the load point which ensures a higher level of efficiency when operating the drive unit.

Another aspect of the present disclosure is a drive assembly with a drive unit as described and an internal combustion engine, which is coupled directly to the rotor of the first electric rotary machine in a rotationally fixed manner by means of an output element of the internal combustion engine.

Thus, the drive assembly is designed such that there is no clutch and no vibration damper arranged between the first electric rotary machine and the internal combustion engine.

The drive assembly has the advantage that it can be designed beneficially with respect to installation space and cost since units which require more installation space or costs, such as, for example, a clutch or a vibration damper, can be omitted between the internal combustion engine and the first electric rotary machine.

In particular, it is provided that there are no gear wheel stages or gear ratios and/or splines arranged between the rotor of the first electric rotary machine and the internal combustion engine.

Due to the fact that there is no mechanical connection between the output element of the internal combustion engine, particularly the crankshaft of the internal combustion engine, and the transmission with respect to transferring a torque provided by the internal combustion engine, vibrating rotational movements or torque fluctuations from the internal combustion engine also do not have to be damped, so that the arrangement of a torsional vibration damper is not necessary at the output of the internal combustion engine.

The described drive assembly thus enables a purely serial operation of the drive units and thus also the operation of a hybrid vehicle in so-called range extender mode, in which chemical energy from fuel is converted into electrical energy and provided to drive the vehicle for the purposes of extending the range.

In particular, the rotor of the first electric rotary machine can function as a flywheel for the internal combustion engine if the rotor of the first electric rotary machine has a sufficiently large enough mass moment of inertia.

The described drive assembly is to be used particularly advantageously for vehicles which are configured for long-term driving operation of less than 130 km/h. These vehicles can easily dispense with the vehicle drive from the combustion engine while simultaneously ensuring the propulsion of the vehicle by the second electric rotary machine. Accordingly, a separating clutch for mechanically coupling the output of the internal combustion engine to the transmission or the drive axles as well as an actuating unit required therefore can be omitted.

When operating a motor vehicle, in particular a hybrid vehicle, with a drive assembly according to the disclosure, comprising a drive unit according to the disclosure and an internal combustion engine, the following driving operating modes, for example, are enabled:

Electric Driving and Recuperation:

The second electric rotary machine is actuated as a traction machine or as a generator. The internal combustion engine and the first electric rotary machine are not in operation.

Serial Driving and Charging:

The internal combustion engine is started by means of the first electric rotary machine, wherein the internal combustion engine can drive the first electric rotary machine and, consequently, the first electric rotary machine is actuated as a generator to charge the battery of the motor vehicle. The second electric rotary machine is actuated as a traction machine.

The driving strategy in so-called range extender mode is based on extending the range of the vehicle, which predominantly draws electrical energy from the vehicle battery for propulsion in that the internal combustion engine drives the first electric rotary machine and thus mechanical energy is converted to electrical energy.

BRIEF DESCRIPTION OF THE DRAWINGS

The disclosure above is explained in detail below against the significant technical background with reference to the accompanying drawings, which show preferred embodiments. The disclosure is not limited in any way by the purely schematic drawings, wherein it should be noted that the embodiments shown in the drawings are not limited to the dimensions shown. In the drawings.

DETAILED DESCRIPTION

Figure 1:
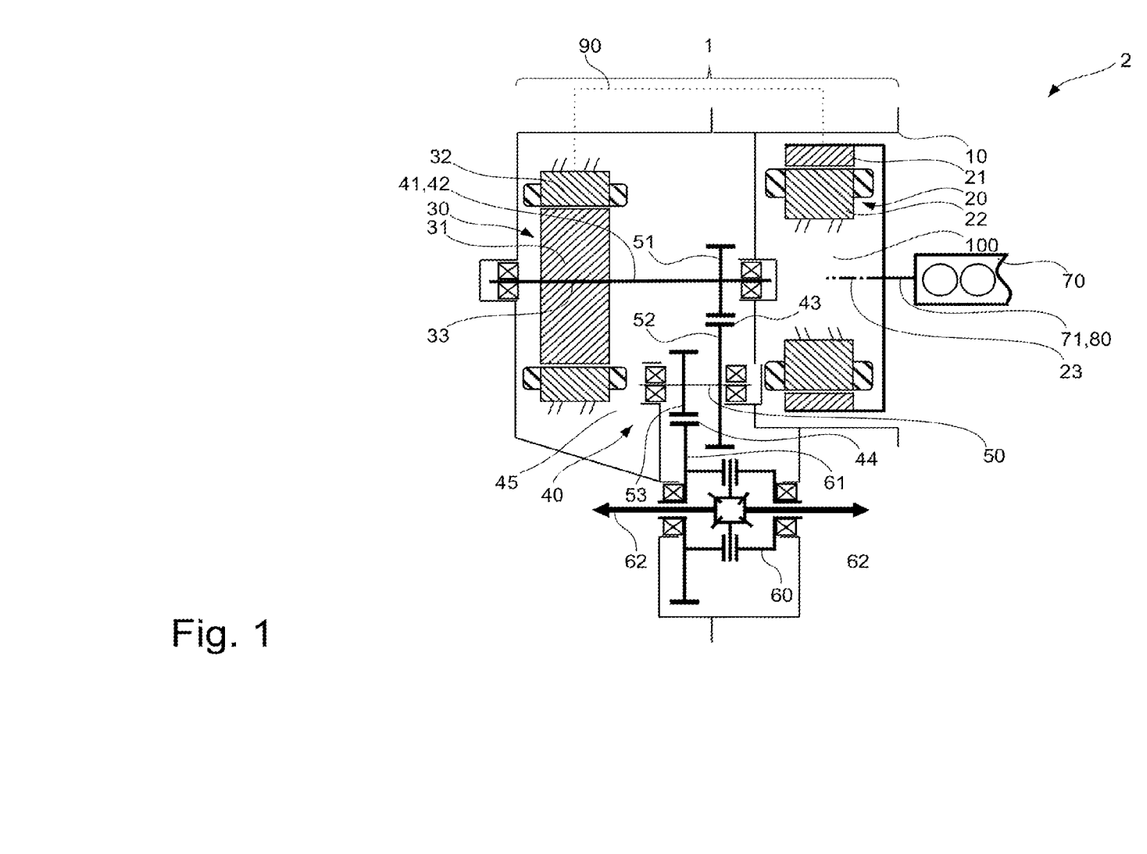
FIG. 1: shows a schematic representation of a drive assembly with a drive unit in a first embodiment.
Figure 2:
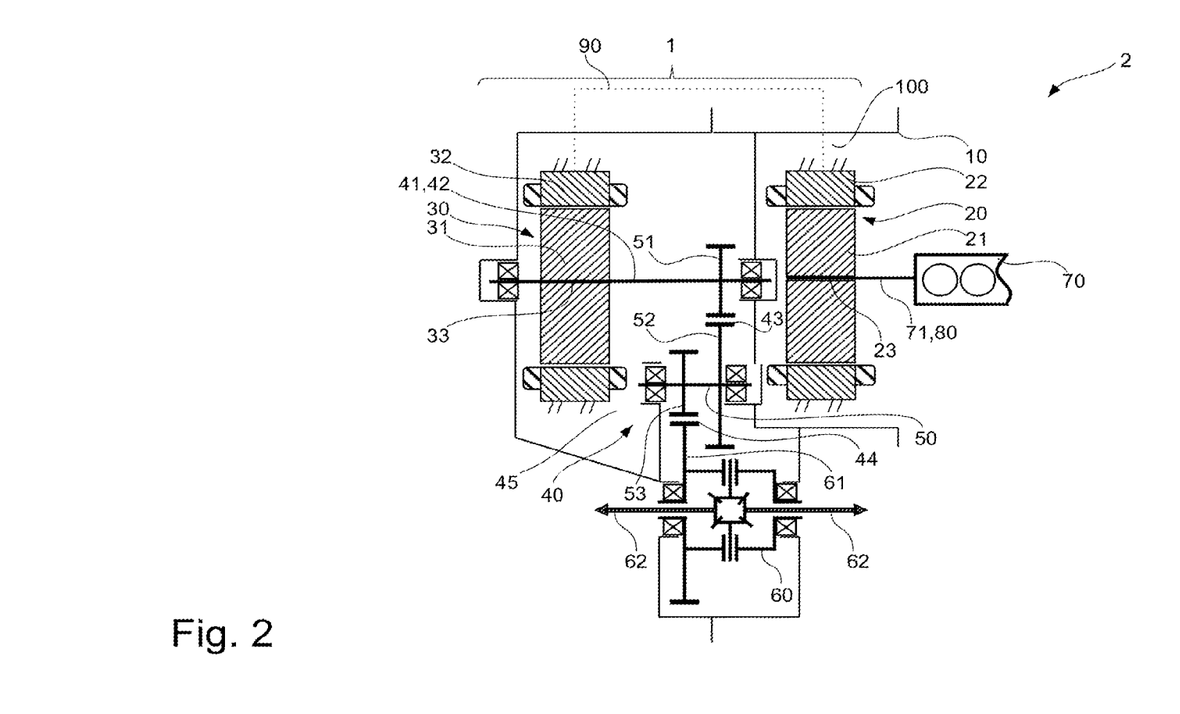
FIG. 2: shows a schematic representation of a drive assembly with a drive unit in a second embodiment.

First, the drive unit 1 and the drive assembly 2 are explained by means of the schematic representations in FIGS. 1 and 2.

The drive units 1 shown in these figures comprise a first electric rotary machine 20 and a second electric rotary machine 30 arranged in a housing 10.

The first electric rotary machine 20 of the drive unit 1 shown in FIG. 1 is designed as an outer rotor machine, so that the rotor 21 of the first electric rotary machine 20 is arranged radially outside the stator 22 of the first electric rotary machine 20.

The first electric rotary machine 20 of the drive unit 1 shown in FIG. 2 is designed as an inner rotor machine so that the rotor 21 of the first electric rotary machine 20 is arranged radially within the stator 22 of the first electric rotary machine 20.

The second electric rotary machine is designed as an inner rotor machine in both exemplary embodiments shown in FIGS. 1 and 2, so that the rotor 31 of the second electric rotary machine 30 is arranged radially within the stator 32 of the second electric rotary machine 30.

In both exemplary embodiments shown in FIGS. 1 and 2, the axis of rotation 23 of the first electric rotary machine 20 and the axis of rotation 33 of the second electric rotary machine 30 are arranged coaxially.

In order to form the drive assembly 2, the rotor 21 of the first electric rotary machine 20 is directly coupled to an output element 71 of the internal combustion engine 70. In particular, this output element 71 may be the crankshaft of the internal combustion engine 70.

This means that the internal combustion engine 70 or the output element 71 thereof is coupled to the rotor 21 of the first electric rotary machine 20 by means of a direct connection 80 and, consequently, without changing the torque, particularly without intermediate engagement of a clutch or a transmission as well as particularly without intermediate engagement of a torque-transmitting element with circumferential clearance.

This enables the design of the drive unit 1 or the drive assembly 2 in a manner which is particularly very space-saving axially.

The rotor 31 of the second electric rotary machine 30 is connected in a rotationally fixed manner to a shaft 42 which forms an input 41 of a transmission 40.

This enables the torque provided by the second electric rotary machine 30 to be transmitted to the transmission 40 shown.

This transmission 40 comprises a first transmission ratio stage 43 as well as a second transmission ratio stage 44. The first transmission ratio stage 43 is implemented on the shaft 42 via a first gear wheel 51 and on an intermediate shaft 50 via a second gear wheel 52 meshing therewith. The shaft 42 is mounted in the housing 10 by means of pivot bearings.

The second transmission ratio stage 44 is implemented via a third gear wheel 53, which is arranged on the intermediate shaft 50, and a drive element 61 of a differential gear 60, which has an outer toothing, with the toothing of the third gear wheel 53 meshing therewith.

In this manner, the torque provided from the second electric rotary machine 30 can be transmitted to the differential gear 60 via the transmission 40, with the torque being supplied from the differential gear to the wheel drive shafts 62.

There is an electrical connection between the first electric rotary machine 20 and the second electric rotary machine 30, wherein this electrical connection 90 advantageously includes a battery (not shown here) as an electrical storage element and/or power electronics (not shown here).

The drive assembly 2 makes it possible for the first electric rotary machine 20 to be driven as a generator during operation of the internal combustion engine 70 and, accordingly, mechanical energy is converted to electrical energy. This electrical energy can be provided via the electrical connection 90 of the second electric rotary machine 30, which converts the electrical energy into mechanical energy and generates a torque during operation of the electric motor. This torque can be used to propel a motor vehicle.

In this case, it is not provided that the torque from the first electric rotary machine 20 is provided from the electric motor and is used to propel a motor vehicle. Accordingly, there are also no torque-impacting transmission elements needed between the first electric rotary machine 20 and an output and/or between the first electric rotary machine 20 and the internal combustion engine 70, so that the drive assembly 2 designed in this manner has very low installation space requirements.

In an advantageous design with an electrical storage element, electrical energy generated by the first electric rotary machine 20 can be intermediately stored before it is converted into mechanical energy by the second electric rotary machine 30.

In addition, this enables an increase or shifting of the load point which ensures a higher level of efficiency when operating the drive unit.

The drive assembly 2 enables the increasing of the range in electric-motor driving operation in a simple, space-saving manner, with the conversion of chemical energy in the internal combustion engine 70, but with an optimum level of efficiency of the internal combustion engine 70.

Figure 3:
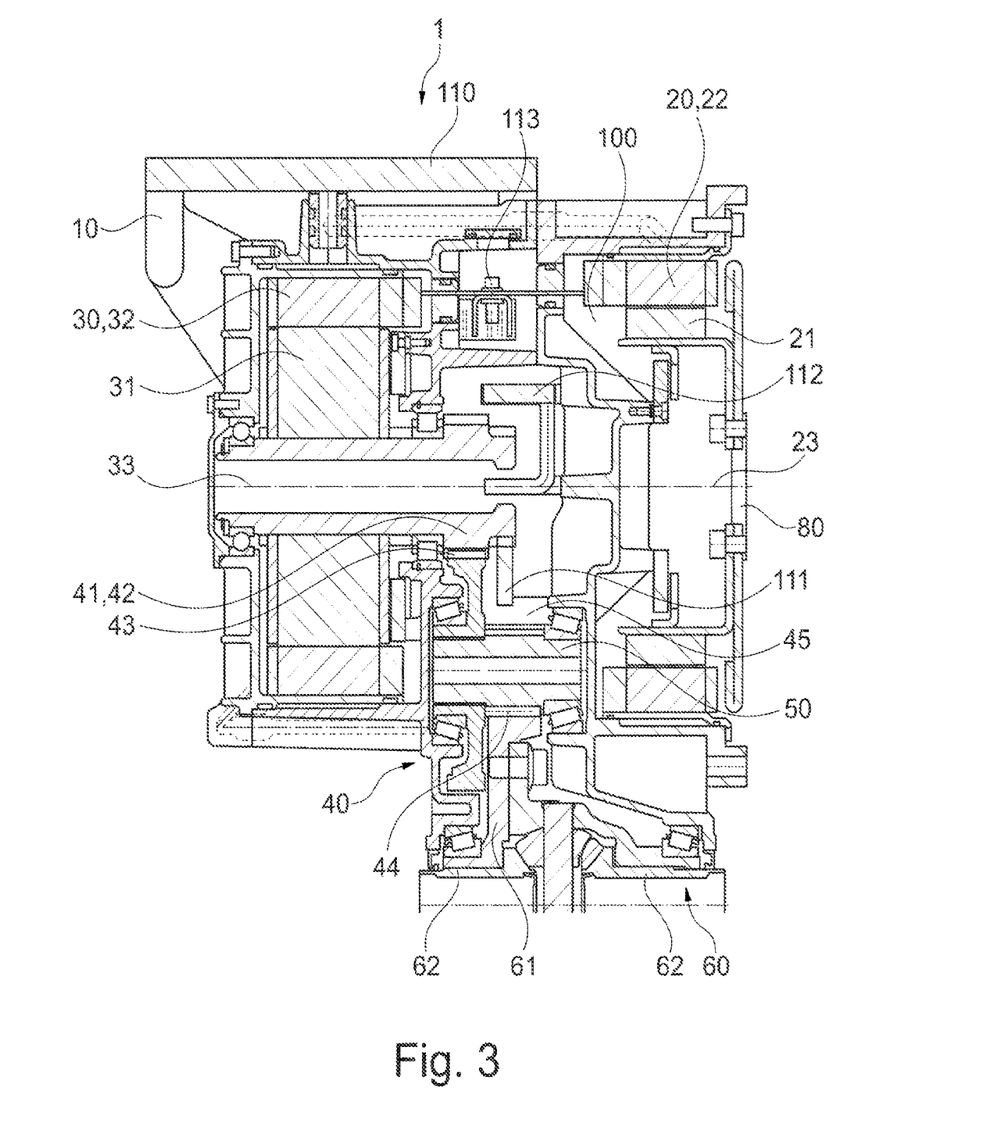
FIG. 3: shows a sectional representation of the drive assembly with the drive unit in the second embodiment.

FIG. 3 shows the drive unit 1 shown in the schematic representation in FIG. 2 in a sectional view.

In addition to the components or units mentioned already as relates to FIG. 2, FIG. 3 shows that the first electric rotary machine 20, which is designed as a generator, is arranged in a generator compartment 100, which is essentially spatially separate from a gear compartment 45, in which the elements of the transmission 40 are arranged.

This enables separate lubrication and/or cooling of the components in both compartments 45, 100.

Furthermore, FIG. 3 shows power electronics 110, which are arranged on the upper side of the drive unit 1, connected to the housing 10.

Further components of the drive unit shown in FIG. 3 include a parking lock 111, as well as an oil collection container 112, and a high voltage terminal 113 for the electrical connection of the electric rotary machines 20, 30.

Figure 4:
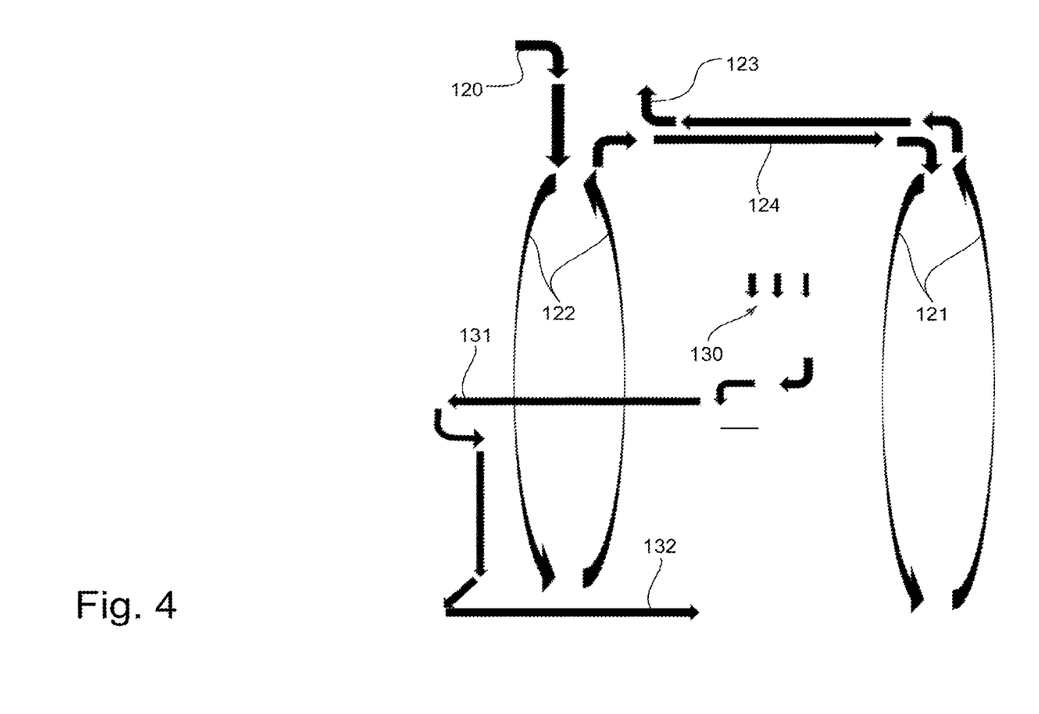
FIG. 4: shows a schematic representation of the cooling system of the drive assembly with the drive unit.

FIG. 4 shows, in a schematic manner, an option for cooling and lubricating the drive unit 1. This figure shows a coolant inlet 120, which is configured to supply coolant from a cooling element to the power electronics and, accordingly, also to the transmission.

From there, the coolant reaches a second coolant circuit 122 assigned to the stator of the second electric rotary machine, and then a first coolant circuit 121, which is assigned to the stator of the first electric rotary machine, via an overflow area 124.

The coolant can then be returned to the external cooling element via a coolant outlet 123.

Lubrication is implemented by an oil collection element 130, among other things, from which oil which is thrown off by the differential gear 80 is collected. From there, the oil can be returned to a return 132 by means of an oil distribution element 131, particularly the shaft, with the return transporting the oil to a sump.

The oil from the oil collection element is advantageously supplied to all necessary locations (e.g. bearings/toothing) via an oil distribution element for lubrication.

The drive unit and drive assembly proposed here enable optimum operation in an economical design and space-saving manner.

LIST OF REFERENCE SYMBOLS

1 Drive unit
2 Drive assembly
10 Housing
20 First electric rotary machine
21 Rotor of the first electric rotary machine
22 Stator of the first electric rotary machine
23 Axis of rotation of the first electric rotary machine
30 Second electric rotary machine
31 Rotor of the second electric rotary machine
32 Stator of the second electric rotary machine
33 Axis of rotation of the second electric rotary machine
40 Transmission
41 Transmission input
42 Shaft
43 First transmission ratio stage
44 Second transmission ratio stage
45 Gear compartment
50 Intermediate shaft
51 First gear wheel
52 Second gear wheel
53 Third gear wheel
60 Differential gear
61 Drive element of the differential gear
62 Wheel drive shaft
70 Internal combustion engine
71 Output element of the internal combustion engine
80 Direct connection
90 Electrical connection
100 Generator compartment
110 Power electronics
111 Parking lock
112 Oil collection container
113 High-voltage terminal
120 Coolant inlet
121 First coolant circuit
122 Second coolant circuit
123 Coolant outlet
124 Overflow area
130 Oil collection element
131 Oil distribution element
132 Oil return to sump

The invention claimed is:

1. A drive unit for a drive train of an electrically drivable motor vehicle, the drive unit comprising:
   a first electric rotary machine adapted for generator operation;
   a second electric rotary machine adapted for drive motor operation;
   a transmission;
   a rotor of the first electric rotary machine is configured for direct mechanical coupling to an output element of an internal combustion engine;
   a rotor of the second electric rotary machine is coupled or couplable to an input of the transmission in a rotationally fixed manner; and there is no torque-transmitting connection between the first electric rotary machine and the transmission.

2. The drive unit according to claim 1, wherein the first electric rotary machine comprises an inner rotor machine.

3. The drive unit according to claim 1, wherein the first electric rotary machine comprises an outer rotor machine.

4. The drive unit according to claim 1, wherein the rotor of the first electric rotary machine comprises a flywheel for operating the internal combustion engine.

5. The drive unit according to claim 1, wherein axes of rotation of the rotors of the first and second electric rotary machines are arranged parallel or coaxially.

6. The drive unit according to claim 1, wherein the first electric rotary machine is arranged in a generator compartment which is spatially separate from the transmission.

7. The drive unit according to claim 1, wherein the transmission comprises at least one or more transmission ratio stages.

8. The drive unit according to claim 1, wherein at least one of the first electric rotary machine or the second electric rotary machine is configured for cooling by a fluid.

9. The drive unit according to claim 1, wherein the first and second electric rotary machines are connected to one another directly in an electrically conductive manner or via power electronics or are connected to one another by an electrical storage element.

10. A drive assembly comprising the drive unit according to claim 1, and an internal combustion engine which is directly coupled in a rotationally fixed manner to the rotor of the first electric rotary machine by an output element of the internal combustion engine.

11. A drive unit for a drive train of an electrically drivable motor vehicle, the drive unit comprising:
   a first electric rotary machine having a first rotor and being adapted for generator operation;
   a second electric rotary machine having a second rotor;
   a transmission;
   the first rotor is configured for direct mechanical coupling to an output element of an internal combustion engine to generate electricity;
   the second rotor is coupled or couplable rotationally fixed to an input of the transmission;
   wherein the first electric rotary electrical machine is in electrical connection with the second electric rotary machine; and
   there is no torque-transmitting connection between the first electric rotary machine and the transmission.

12. The drive unit according to claim 11, wherein the first electric rotary machine comprises an inner rotor machine.

13. The drive unit according to claim 11, wherein the first electric rotary machine comprises an outer rotor machine.

14. The drive unit according to claim 11, wherein the first rotor comprises a flywheel of the internal combustion engine.

15. The drive unit according to claim 11, wherein axes of rotation of the first and second rotors are arranged parallel or coaxially.

16. The drive unit according to claim 11, wherein the first electric rotary machine is arranged in a generator compartment which is spatially separate from the transmission.

17. The drive unit according to claim 11, wherein the transmission comprises at least one or more transmission ratio stages.

18. The drive unit according to claim 11, wherein at least one of the first electric rotary machine or the second electric rotary machine is configured for cooling by a fluid.

19. The drive unit according to claim 11, wherein the first and second electric rotary machines are connected to one another directly via power electronics or are connected to one another by an electrical storage element.

* * * * *